United States Patent [19]
Roberts

[11] 3,725,862
[45] Apr. 3, 1973

[54] LINE FINDING SYSTEM AND METHOD FOR CHARACTER RECOGNITION

[75] Inventor: David C. Roberts, Rochester, Minn.

[73] Assignee: International Business Machines Corporation, Armonk, N.Y.

[22] Filed: June 25, 1971

[21] Appl. No.: 157,047

Related U.S. Application Data

[63] Continuation of Ser. No. 790,615, Jan. 13, 1969, abandoned.

[52] U.S. Cl. ..................340/146.3 H, 340/146.3 AH
[51] Int. Cl. ..............................................G06k 9/00
[58] Field of Search...........340/146.3 AH, 146.3 H, 340/146.3 D; 178/7.7

[56] References Cited

UNITED STATES PATENTS

| | | | |
|---|---|---|---|
| 3,462,737 | 8/1969 | Malaby | 340/146.3 H |
| 3,509,415 | 4/1970 | Bartz | 340/146.3 H |
| 3,593,284 | 7/1971 | Frank | 340/146.3 AH |
| 3,501,623 | 3/1970 | Robinson | 340/146.3 AH |
| 3,539,993 | 11/1970 | Hardin et al. | 340/146.3 AH |
| 3,582,886 | 6/1971 | Hardin et al. | 178/7.7 |

*Primary Examiner*—Thomas A. Robinson
*Assistant Examiner*—Joseph M. Thesz, Jr.
*Attorney*—J. Michael Anglin, Carl W. Laumann and J. Jancin, Jr.

[57] ABSTRACT

In an optical character recognition system the position of a line of characters is detected during the period when the recognition system is not reading the characters but is executing an aging scan which is normally used only for moving the recognition beam around to prevent burns on the face of the recognition system video scanner. The line positions are stored for use during the read mode of the recognition system. The positions of lines actually read during the read mode are compared with these stored positions to determine that all lines in stored positions were actually read. If not read, the read mode is re-executed to read these lines.

8 Claims, 7 Drawing Figures

INVENTOR
DAVID C. ROBERTS

BY Sughrue, Rothwell, Mion, Zinn & Macpeak
ATTORNEYS

LINE FINDING SYSTEM AND METHOD FOR CHARACTER RECOGNITION

This application is a continuation of application Ser. No. 790,615, filed Jan. 13, 1969, now abandoned.

BACKGROUND OF THE INVENTION

1. Field of the Invention

This invention pertains to the field of character recognition systems and methods and more particularly to a line finding system and method for use with character recognition.

2. Description of the Prior Art

It is known in prior art optical character recognition systems to focus a group of lines of characters on a document onto the face of a flying spot scanner. The area onto which the lines are focused is called a window. The lines are read by the recognition system and then the document is indexed to provide a new group of lines in the window. In order for a given line to be read, the system must know the vertical position of the line of characters.

In character recognition systems for reading data without fixed format, a recognition electron beam must ordinarily search for a line before reading the characters on that line. This search is relatively slow and results in lost or skipped lines when speeded up.

Some prior art systems have a special beam-rest mode for use when the beam is not actually being used for recognition. This mode is called an aging mode and is used, in the prior art, primarily to keep the beam active, thereby avoiding burning phosphors in the scanner tube. In other respects, this time is wasted.

SUMMARY OF THE INVENTION

In accordance with the present invention the aging mode of a character recognition system is used to detect and store the line positions of all lines in the window which are to be read during the recognition mode. This can be done because during the aging mode the beam sweeps much of the window. Each time the beam intercepts a line, a video pulse is generated. The video pulses are used to enable a storage cell means which stores a value representing the vertical position of the beam at that time and therefore also represents the position of the line. Plural storage cells are provided to store line positions for plural lines. Means are provided for preventing a single line from being stored in more than one storage cell.

During the recognition mode, which is executed by a prior art system for which the invention herein is adapted, the system of the invention monitors the beam position and provides an indication when a line is read which corresponds to a stored line. Checking means, which monitors the latter mentioned indications, indicates if a line has been missed by the recognition scan.

Thus, skipping of lines is avoided or at least reduced to a minimum. The time used for the preliminary location of lines would otherwise be wasted aging cycle time, whereby the speed and efficiency of the system are improved. Furthermore, the present system does not require that line-position coordinates be stored in any particular chronological sequence, as a reordering operation is automatically achieved by the system during its recognition-mode operation.

DESCRIPTION OF THE PREFERRED EMBODIMENT

Figure 1:
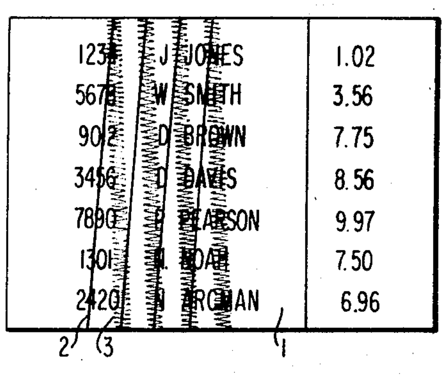
FIG. 1 is a diagram of a window associated with a scanner tube, including lines of characters.

FIG. 1 is a diagram of the pattern with which a window 1 is swept during the aging mode in an optical character recognition (OCR) system. Seven lines of characters are present within the window as illustrated. An electron beam sweeps rapidly in one direction 2 and in an oscillatory pattern 3 in the opposite direction. Aging mode operation, as used in the prior art, is a method of keeping the beam moving to avoid burning spots in the coating of the video scanner tube during times when the OCR mode is not in use. In accordance with the present invention the oscillatory scan pattern during the aging mode is utilized for detection and storage of the vertical positions of the individual lines in the window.

Figure 2:
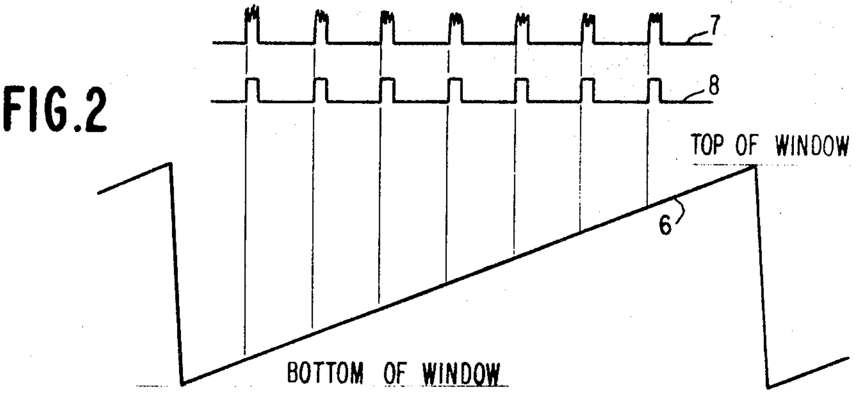
FIG. 2 is a waveform diagram associated with the invention.

FIG. 2 is a waveform diagram showing the signals used in connection with the aging mode to locate the lines of characters for subsequent recognition. A sawtooth vertical-sweep waveform 6 deflects the beam from the bottom to the top (or top to bottom) of the recognition window of the video scanner tube during oscillatory pattern 3 of beam movement. The pattern of ragged pulses in waveform 7 represents the positions during a single sawtooth vertical sweep when markings (characters) are encountered. The pulses on line 8 represent a cleaned-up set of pulses representing marking positions. Many processes known in the art are capable of producing clean pulses as in line 8 from ragged pulses as in line 7. An electrical signal corresponding to line 8 is a digitized video signal as used in the illustrated embodiment of the invention.

Figure 3A:
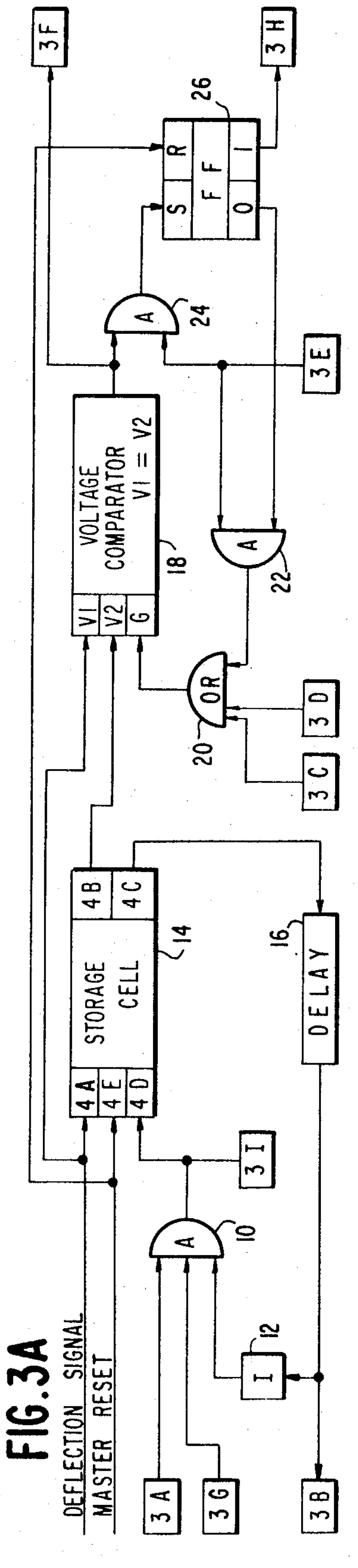
FIG. 3A is a block diagram of a single storage channel used in the invention.
Figure 3B:
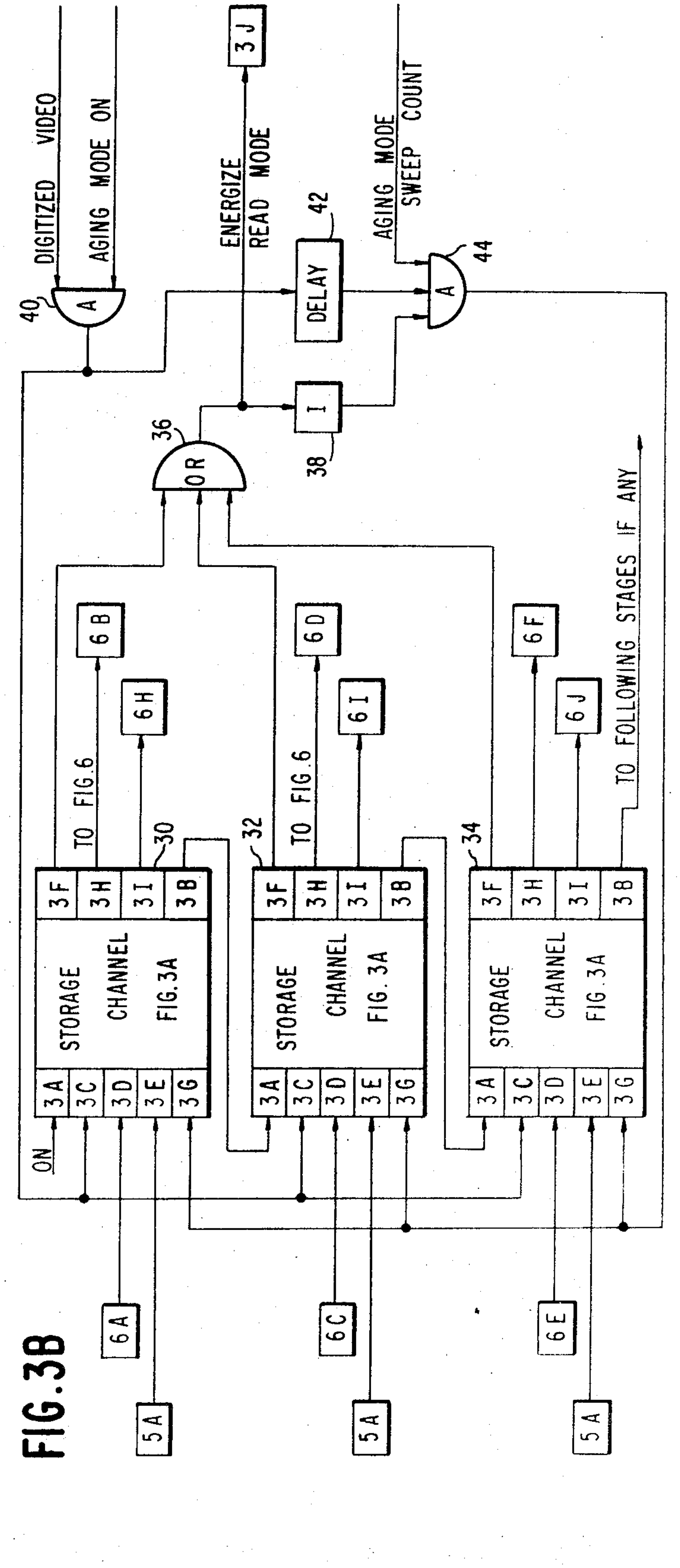

Each pulse 8 illustrated in FIG. 2 is used to enable one of the storage channels 30, 32 and 34 of FIG. 3B, each of which stores the instantaneous value of sawtooth waveform 6, thereby storing a value which represents vertical position of a line. Before an explanation of the operation of the overall embodiment in FIG. 3B, 5 and 6, an example of a storage channel for use in FIG. 3B and its operation will be described in connection with FIG. 3A.

In FIG. 3A, an AND gate 10 receives three inputs. One input is from a terminal 3A, one is from a terminal 3G, and one is from the output of an inverter 12. As will be explained below, the signal from terminal 3G carries line position pulses from waveform 8. The signal from terminal 3A carries an ENABLE STORE signal from the previous channel when the previous channel has already stored a line position. The signal from inverter 12, when in an UP condition, indicates that the illustrated channel is storing a line position and will be disabled from storing another line position at the cessation of the line position pulse from waveform 8. If AND gate 10 is fully energized (i.e., receives a line position pulse, an ENABLE STORE signal, and a NOT DISABLE STORE signal) a line position pulse will be passed by the AND gate to an output terminal 3I. The AND gate output signal is also applied to trigger input terminal 4D of a storage cell 14 where it will cause the storage cell to store the analog input signal value then appearing on analog signal input terminal 4A of the storage cell. The analog input signal is the deflection ramp or sawtooth voltage represented by waveform 6 in FIG. 2. The storage cell actually stores the voltage value of the ramp at the time the line position pulse is received.

The storage cell provides two outputs. A cell occupancy output from terminal 4C indicates that the cell is storing a line position. This output is applied to a delay unit 16 to provide an ENABLE STORE signal for the next adjacent channel at terminal 3B at the end of the time delay. The output from terminal 4C is also applied after a delay to inverter 12, thereby disabling AND gate 10 and preventing the storage cell 14 from storing another line position.

An analog output from terminal 4B of the storage cell is proportional to the analog value of the stored signal. The terminal 4B output is applied to an input terminal V2 of a voltage comparator 18. The deflection ramp signal is applied to an input terminal V1 of voltage comparator 18.

An OR gate 20 receives three signals; first a signal from terminal 3C as represented by curve 8, FIG. 2, during the aging mode; second a signal from terminal 3D which occurs at the end of the read mode to indicate whether all stored lines were read; and third, a signal from an AND gate 22. Any one of the three signals causes an output signal from the OR gate which is applied to terminal G of the voltage comparator 18 to gate the comparator ON.

Comparator 18, when gated ON, provides an output signal to terminal 3F and to AND gate 24 when the deflection signal at terminal V1 equals the stored line position value at terminal V2. The other input to AND gate 24 comes from terminal 3E, which is connected to receive a LOW RESOLUTION SEARCH MODE signal from FIG. 5.

It will be noted that the LOW RESOLUTION SEARCH MODE signal occurs during the recognition scan and is applied to AND gates 22 and 24. The output of AND gate 24 sets flip-flop 26 which in turn provides an output at terminal 3H. Consequently, if and only if the beam is at a vertical position during the read mode corresponding to the vertical line position stored in storage cell 14, there will be an output at terminal 3H. The latter output indicates that the line corresponding to the stored line has been read. Note that, due to the connection between the zero output of flip-flop 26 and the AND gate 22, once flip-flop 26 has been set, the AND gate 22 cannot be fully enabled.

A MASTER RESET signal, generated by the prior art recognition system when each recognition mode is completed, is applied to terminal 4E of storage cell 14 and to the RESET terminal of flip-flop 26 to reset them. It is also used in other locations as illustrated.

FIG. 3B is a block diagram of a system in which several storage channels 30, 32 and 34, are combined to form a line position storage system. Although three channels are illustrated for ease of explanation, any number can be used; in practice, more than three would be used.

Signals from terminals 6A, 6C, and 6E to the storage channels of FIG. 3B come from FIG. 6 and, as will be explained, are indications that lines having positions corresponding to those stored in the channels have not been read at the line when the recognition mode would normally be ended. Signals from terminal 5A (FIG. 5) to the storage channels indicate that a low resolution search mode is in progress during which the system searches for lines (during the recognition mode) rather than reads characters (which latter mode might be called a high resolution search mode). The signals at terminals 6B, 6D and 6F (from FIG. 3B) indicate that the read mode has been executed for the corresponding line locations. The signals at terminals 6H, 6I and 6J (from FIG. 3B) are pulses indicating that the corresponding channel is then storing a line position. The signal at terminal 3J (from FIG. 3B) indicates that the line then being scanned has already been stored.

When any channel is storing a line position, it provides (after a short delay) an output from its output terminal 3B which is applied to the input terminal 3A of the next storage channel, thereby enabling the next channel to store a line position value. The short delay is caused by delay unit 16 of FIG. 3A. The terminal 3A of channel 30, the first in the series, is permanently energized in order to provide an initial entry point into the line-storage operation. Similarly, the output 3B of the last channel in the series is left unconnected.

The delay is used to prevent adjacent storage channels from storing the same line position. The delay value chosen must be long enough to allow vertical scanning of any line without providing a double signal, i.e., it must be equal in time to the line position pulse, while being short enough to avoid blocking a signal from the next line position.

After one sweep of the aging mode ramp, many of the line positions will be stored in the system. During subsequent ramps, it is necessary to prevent the same line positions from being stored in a second storage channel. Consequently, during the aging mode when digitized video signals are being applied to terminal 3C of each storage channel, each line position pulse in these signals will gate ON each voltage comparator 18. If the then existing deflection signal at terminal V1 is the same value as a line position voltage stored in cell 14, the comparator will provide an output from terminal 3F.

The signals from terminals 3F of each of the storage channels are applied to inputs of an OR gate 36. The presence of a pulse at the output of gate 36 indicates that the line presently being scanned has already been stored and should not be stored again. Inverter 38 takes this signal and provides a signal for all other lines, indicating that any other such line then being scanned may have its position stored.

An AND gate 40 provides an output during the aging mode when there are digitized video signals. This output is applied, as previously stated, to terminals 3C of the storage channels. The same output is also applied to a delay unit 42. An aging mode count signal, which is UP for a fixed number of aging cycles, then drops, is applied as one input to an AND gate 44. The other inputs to gate 44 are the signals from inverter 38 and delay 42. The output of AND gate 44 provides a slightly delayed line scan pulse each time a line is scanned which was not previously stored. This output is applied to terminals 3G of each storage channel to enable storage of a line position.

Figure 5:
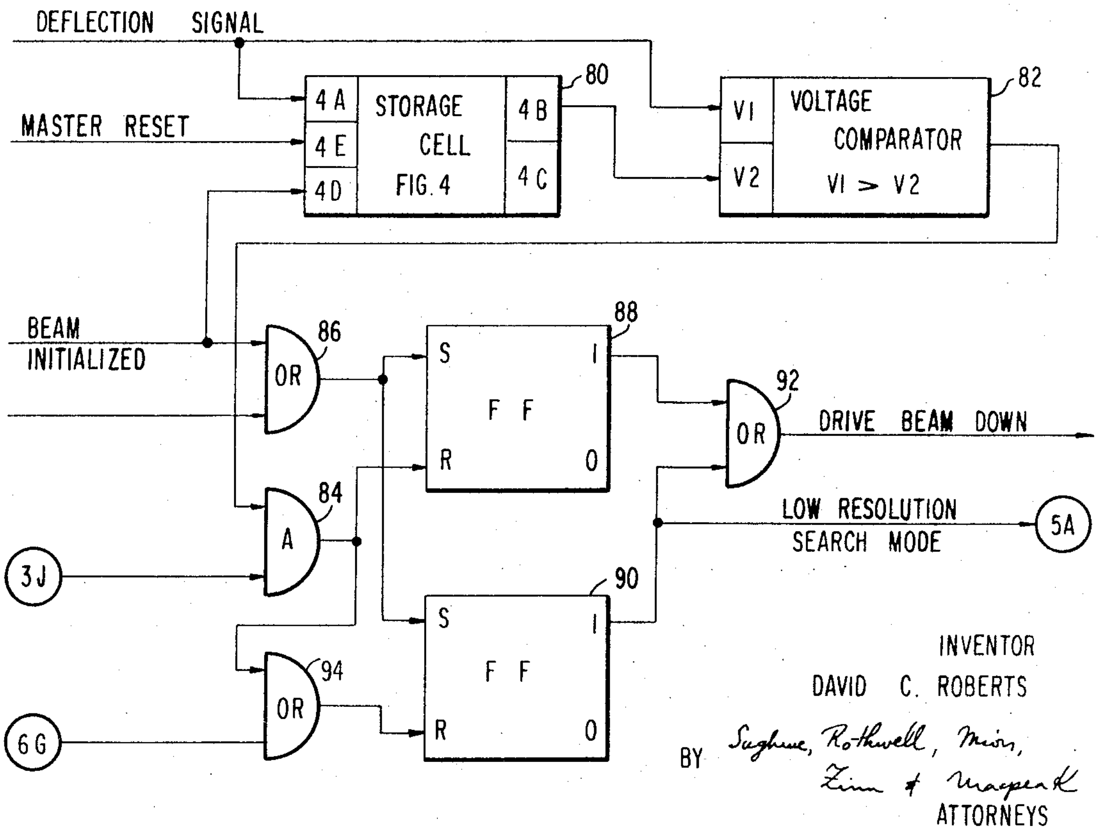
FIGS. 3B, 5, and 6, taken together, form a block diagram of a preferred embodiment of the present invention.

FIG. 5 is a schematic block diagram of a circuit for prevention of rereading of a previously read line after indexing. When the contents of a window have been completely read, there is a MASTER RESET signal which rests the entire system, including a storage cell 80. The characters in the window are then indexed to put a wholly or partially new set of characters into the window. If only a partially new set is introduced, the line which was previously the bottom line may be moved up to form a new top line. In a manner known in the art, the deflection signal is arranged to follow the bottom line to the top of the window, thereby preventing over-indexing. When the beam is initialized for the beginning of an aging cycle, a BEAM INITIALIZED signal is applied to terminal 4D of storage cell 80, causing the cell to hold the deflection value of the former bottom line which was tracked to the top.

The stored deflection value is provided to terminal V2 of a voltage comparator 82. The DEFLECTION signal is applied to the other terminal V1 of comparator 82. When V1 > V2, comparator 82 provides an output signal to one of the two inputs of an AND gate 84.

An OR gate 86 receives two inputs, the BEAM INITIALIZED signal and an END OF LINE signal which occurs after each line has been fully read. Either input causes an output to set two flip-flops 88 and 90. Each flip-flop, when ON, provides an output to an OR gate 92. The output of OR gate 92 is a DRIVE BEAM DOWN signal. Additionally, the ON output of flip-flop 90 is a LOW RESOLUTION SEARCH MODE signal.

The output of AND gate 84 is applied, as a RESET signal, to flip-flop 88. The output of gate 84 is also applied as one input to an OR gate 94. The other input to the OR gate 94 is derived from terminal 6G of FIG. 6, as explained below in more detail. Gates 84 and 94 are arranged to rese flip-flops 88 and 90 to cause the system to leave the low resolution search mode and to enter a character recognition mode. At the next END OF LINE signal, the beam is driven down again. It will be noted that the above described system inherently reads lines in consecutive order from one end of the window to the other, even though the line-position coordinates may have been stored in the channels 30, 32, 34 in a different chronological order. This occurs because the read mode begins with the beam being driven downward from the top of the window by the signal from OR gate 92. Thus, the highest line-position voltage in any of the cells 14 will activate its corresponding comparator 18 before any lower stored voltage is reached by the deflection signal.

Figure 6:
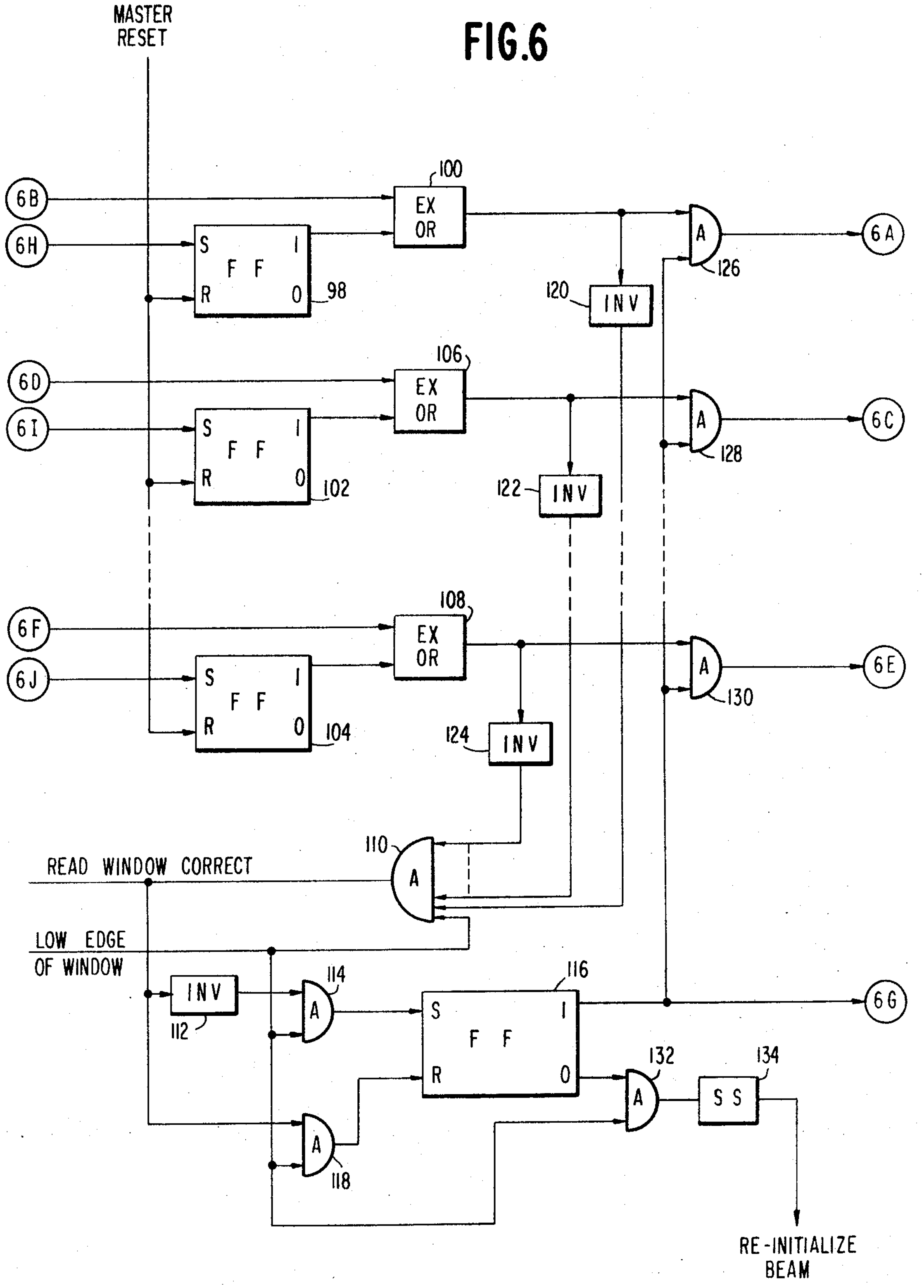

FIG. 6 is a schematic block diagram of a circuit for determining that all lines located during the aging mode are read during the read mode.

A signal on terminal 6H comes from terminal 3I of storage channel 30, (FIG. 3B) indicating whether or not channel 30 has stored a line location. If channel 30 has stored a line location, the signal from terminal 6H is applied, as a SET signal, to a flip-flop 98. The ON output from flip-flop 98 is applied as one of two inputs to an EXCLUSIVE OR gate 100. The other input to gate 100 comes from a terminal 6B.

Terminal 6B derives its signal from terminal 3H of storage channel 30 in FIG. 3B. As shown in FIG. 3A, terminal 3H carries an ON signal from flip-flop 26 when AND gate 24 indicates that the read mode has been executed at the stored line location. The output of EXCLUSIVE OR gate 100 is either ON or OFF. If ON, it indicates that a line position was stored and the line at that position has been read or that no line position was stored and no line corresponding position has been read, both of which are proper conditions for complete reading of all stored positions. If the output of gate 100 is OFF, it indicates that either a line position was stored and a corresponding line was not read or that a line was read that corresponded to no stored line (an unlikely alternative).

Flip-flops 102 and 104 and EXCLUSIVE OR gates 106 and 108 perform a similar function for storage channels 32 and 34 (FIG. 3B). The outputs from gates 100, 106 and 108 are applied, respectively through inverters 120, 122, and 124, to an AND gate 110 together with a LOW EDGE OF WINDOW signal indicating that the read scan has progressed to the low edge of the window, thereby to provide an ON (READ WINDOW CORRECT) output only when all stored line positions have been read and when the low edge of the window has been reached.

An inverter 112 provides a READ WINDOW NOT CORRECT signal to an AND gate 114, which also receives the LOW EDGE OF WINDOW signal, thereby setting a flip-flop 116 when the low edge of the window is reached without reading all stored positions. The resulting ON signal is applied to terminal 6G for use in the circuit of FIG. 5 to cause high resolution search.

An AND gate 118 receives the LOW EDGE OF WINDOW signal and the READ WINDOW CORRECT signal to RESET flip-flop 116. Of course AND gate 118 is illustrated for ease of understanding but could be omitted. The existence of the READ WINDOW CORRECT signal implies that the LOW EDGE OF WINDOW signal was also present at gate 110. Flip-flop 116 could be RESET by the READ WINDOW CORRECT signal.

The outputs of gates 100, 106 and 108, indicating by an ON output that the channel has not been properly read, are applied to respective AND gates 126, 128 and 130, which also receive the ON signal from flip-flop 116. Output signals from the AND gates on terminals 6A, 6C or 6E indicate that the corresponding storage channel must be specially read. These terminals are connected back to the corresponding storage channels to cause the stored values to be read.

When all stored line positions have been read, the ZERO output from flip-flop 116 is applied to an AND gate 132 together with the LOW EDGE OF WINDOW signal, causing a single-shot device 134 to emit a pulse to RE-INITIALIZE the beam.

Although the circuit of FIG. 5 causes the system to seek out and read each previously stored line position, with slight modifications the system could serve as a double-check on line positions read rather than as a director of reading. In such a system, the actual reading would take place as in the prior art, but with an additional comparison against previously stored line positions. Only those stored line positions which were not read during the normal read operation would then be read under control of the novel system. In those cases in which the order in which the lines are read is relevant, a line coding scheme could be used to restore proper order to the skipped lines picked up during the additional comparison operation.

Figure 4:
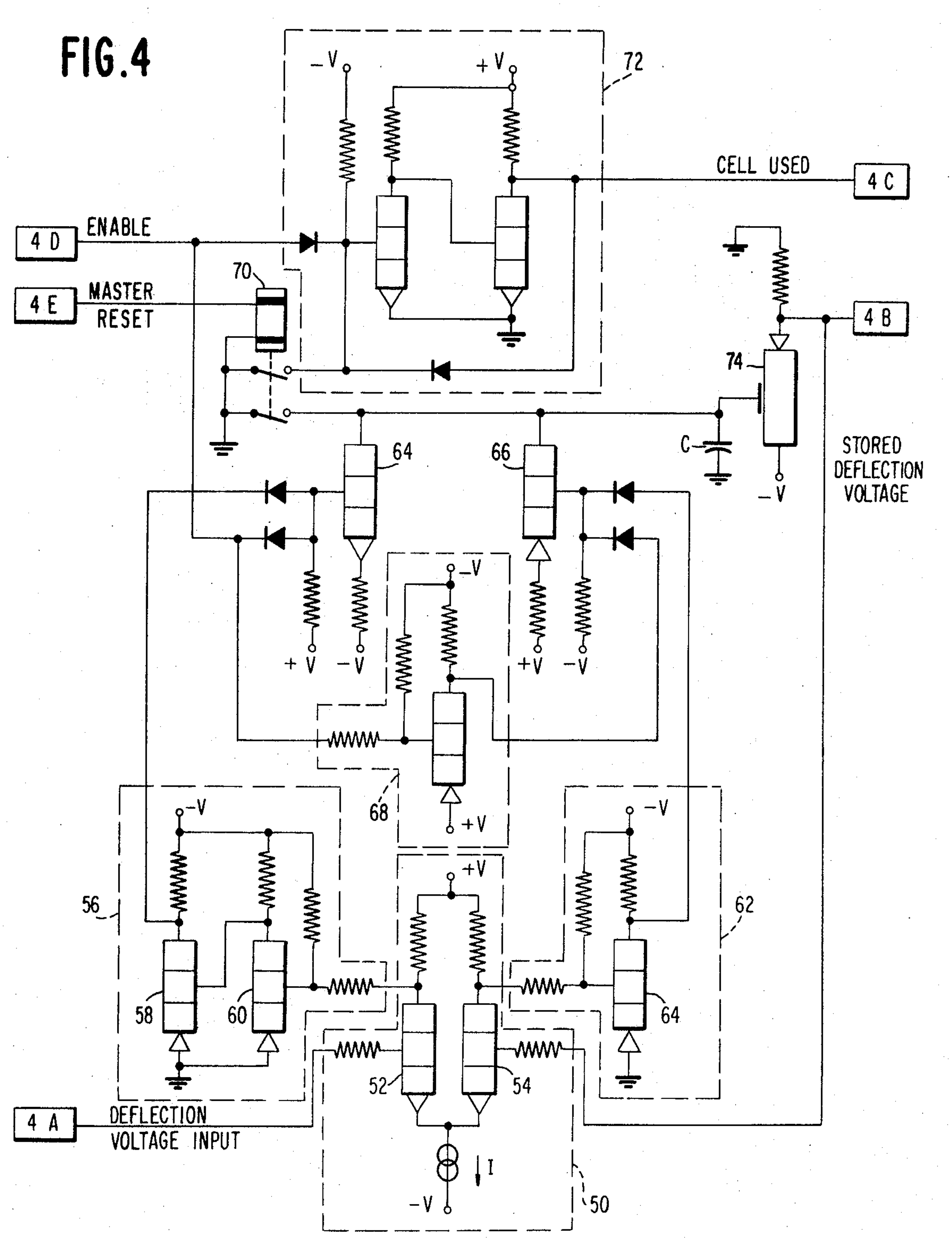
FIG. 4 is a schematic diagram of a storage cell for use with the invention.

FIG. 4 is a schematic diagram of one example of a circuit which may be used as the storage cell 14 of FIG. 3A. The terminals 4A, 4B, 4C, etc., correspond respectively to the same terminals of FIG. 3A.

The circuit operates, when enabled by an ENABLE input at terminal 4D, to store a voltage on a capacitor C which is dependent upon and represents the deflection voltage presently applied at terminal 4A. The circuit comprises a differential amplifier 50, switches 56, 62 and 68, gating transistors 64 and 66, relay 70, latch 72 and field effect transistor 74. The field effect transistor (or other high-impedance device) 74 is connected in the follower mode so that the output therefrom represents the voltage on capacitor C. The output therefrom is applied to the output terminal 4B and also to one input of differential amplifier 50, which comprises transistors 52 and 54. The other input to differential amplifier 52 is the deflection voltage at terminal 4A.

The differential amplifier 50 turns on switch 56 or switch 62 depending upon which of the two input voltages thereto is greatest. The switches 56 and 62 then discharge or charge capacitor C via gating transistors 64 or 66 to cause the voltage on capacitor C to be proportional to the deflection voltage.

The latter described operation, in which the voltage on capacitor C follows the deflection voltage, only takes place during the existence of an ENABLE signal at terminal 4D. The reason for this is that gating transistors 64 and 66 are normally biased to cut off and therefore do not allow charging and discharging of capacitor C. However, when an ENABLE signal occurs, the cutoff biases of transistors 64 and 66 are removed. The cutoff bias of transistor 66 is removed via inverting transistor switch 68.

The ENABLE signal also sets the latch 72 thereby providing an output at terminal 4C which indicates that the storage cell is in use. A MASTER RESET signal at terminal 4E operates to reset latch 72 and discharge capacitor C as a result of the action of relay 70.

While the invention has been particularly shown and described with reference to a preferred embodiment thereof, it will be understood by those skilled in the art that various changes in form and details may be made therein without departing from the spirit and scope of the invention. It will especially be appreciated that a system according to the present invention may be employed without significant change to store sets of horizontal coordinates corresponding to the beginnings and endings of lines to be read, either instead of or in addition to the vertical line-position coordinates which have been particularly described herein.

I claim:

1. In an automatic character recognition system of the type in which i. a plurality of lines of characters are optically directed onto a recognition window area of a pick-up device, ii. an electron beam is directed at said window area to interpret the positions and configurations of said lines of characters, iii. said beam is scanned over said window area in a substantially predetermined pattern during intervals when no characters are being recognized to thereby prevent excessive aging of said pick-up device in said window area, and iv. said beam is directed at said window in a recognition pattern during intervals when characters are being recognized, the improvements comprising, a. means for determining and concurrently storing indications of the respective positions of a plurality of said lines of characters during said intervals when no characters are being recognized, said means for determining and storing indications including a storage channel for association with each of said lines, said channel comprising storage means for storing an analog signal, said storage means including an analog signal input terminal, a trigger storage input terminal, and an analog output terminal, means for applying a deflection signal proportional to the position of said beam to said analog signal input terminal, means for applying a signal to said trigger storage input terminal when a previously unstored line position is determined during said intervals when no characters are being recognized if and only if all storage channels prior to, but not including said channels are occupied whereby storage of said deflection signal value is triggered, and means for providing an output signal proportional to the stored deflection signal value at said analog output terminal.

b. means for comparison of the respective positions of lines of characters read during said intervals when characters are being recognized with said indications of the respective positions as previously stored, and c. means responsive to said comparison for providing an indication of whether each line having a previously stored position has been read.

2. A system according to claim 1 including means responsive to said respective positions previously stored for successively directing said beam to stored locations of lines for reading the lines at those locations.

3. In a character recognition system, the combination comprising:

a. means for repetitively scanning a plurality of character entities;

b. means for generating, for each character entity, a signal representing its position;

c. a plurality of storage means for storing said generated signals;

d. means responsive to each of said generated signals for determining if the generated signal has already been stored;

e. means responsive to the last-named means for entering into said storage means only those generated signals which have not previously been stored during the repetitive scanning of said document area;

f. means for enabling a first of the plurality of storage means to receive a first of the generated signals for storage therein;

g. means for inhibiting said first of the plurality of storage means from receiving subsequent generated signals after the first of the plurality of storage means has a first of the generated signals stored therein, h. further means associated with each of the additional storage means and corresponding to said means for enabling and said means for inhibiting associated with said first storage means for enabling each of the additional storage means to receive a generated signal and inhibiting the storage means from receiving subsequent signals after a generated signal is stored therein.

4. The combination of claim 3 further comprising:

a. means for passing a recognition scan pattern over the document area, b. means for comparing the current location of the recognition scan pattern against positions of character entities as represented by stored generated signals; and c. means for enabling the recognition of characters in a character entity when the position of the recognition scan pattern corresponds to the position of one of said character entities.

5. The combination of claim 4 further comprising:

a. means for repetitively passing the recognition scan pattern over the document area;

b. means for producing a disable signal for each character entity whose position has been determined to correspond to a location of said recognition scanning pattern; and c. means for inhibiting the recognition of characters in each character entity for which a disable signal has been produced.

6. In a character recognition system, a method for locating and storing the positions of character entities on a document, comprising the steps of:

a. repetitively scanning a document area containing a plurality of character antities, b. generating for each character entity a signal representing its position in the area, c. determining, for each generated signal, if the position represented by the generated signal has previously been stored in any of a plurality of storage means, d. storing a generated signal in one of the storage means if a signal corresponding to the position of the detected character entity has not previously been stored;

e. enabling a first of said plurality of storage means to receive a first of the generated signals for storage therein;

f. causing said first of the plurality of storage means to enable a second storage means to store a second generated signal;

g. repetitively passing a recognition scan pattern over the document area, h. producing a disable signal for each character entity whose position has previously been found to correspond to a position of said recognition scan pattern, and i. inhibiting the recognition of characters in each character entity for which a disable signal has been produced.

7. The method of claim 6 further comprising:

a. passing a recognition scan pattern over the document area, b. comparing the current location of the scan pattern against the positions of the character entities represented by the generated signals stored in the plurality of storage means, and c. enabling the recognition of the characters in a character entity when the position of said recognition scan pattern corresponds to the position of one of said character entities.

8. The method of claim 6 wherein said character entities are lines of characters.

* * * * *